Jan. 2, 1968

L. N. DAVIS 3,361,438

NESTABLE SHOPPING CARRIER WITH PIVOTAL
HANDLE SUPPORTING A REAR GATE

Filed Sept. 9, 1965

INVENTOR.
LYNN N. DAVIS

BY
Woodhams, Blanchard & Flynn

ATTORNEYS

Jan. 2, 1968
L. N. DAVIS
3,361,438
NESTABLE SHOPPING CARRIER WITH PIVOTAL
HANDLE SUPPORTING A REAR GATE
Filed Sept. 9, 1965
2 Sheets-Sheet 2
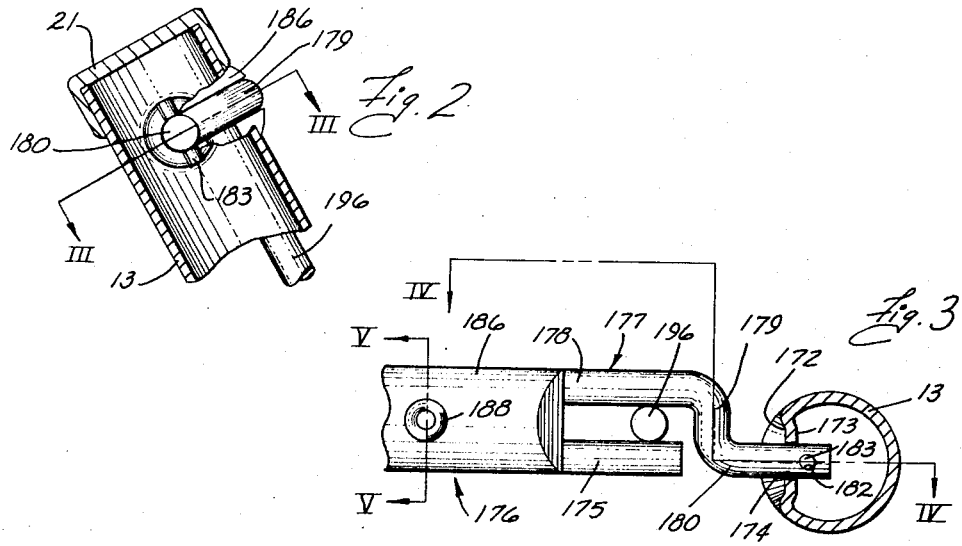
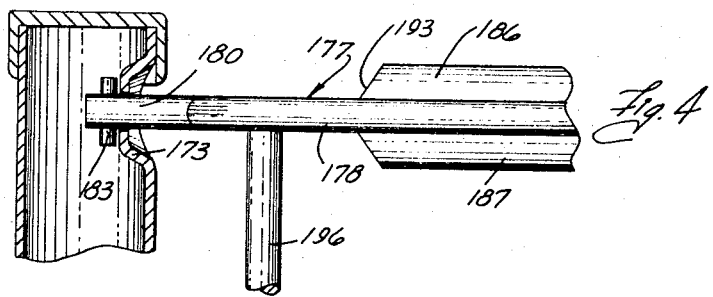
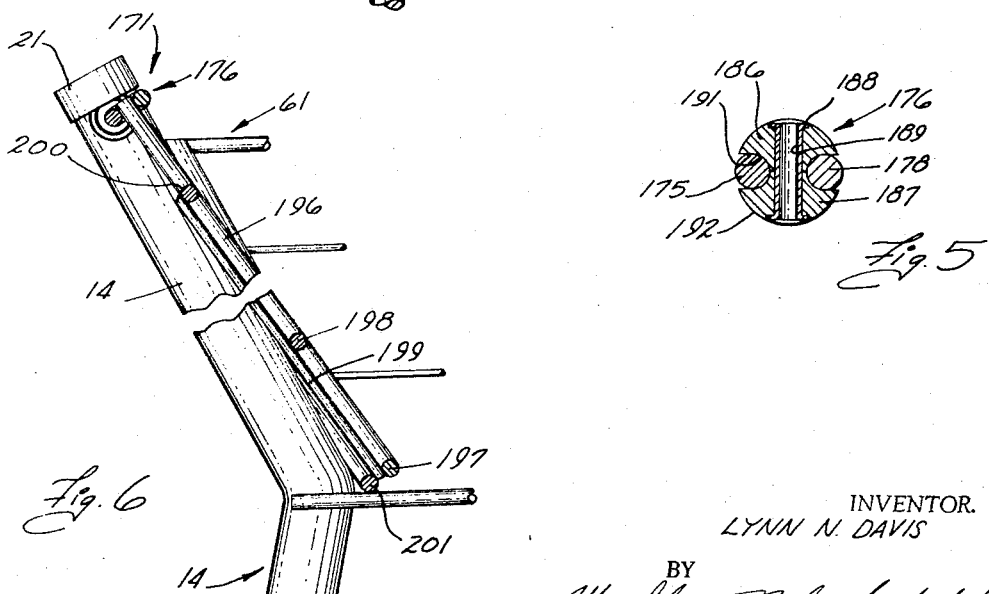
INVENTOR.
LYNN N. DAVIS
BY
Woodhams, Blanchard & Flynn
ATTORNEYS

United States Patent Office 3,361,438
Patented Jan. 2, 1968

3,361,438
NESTABLE SHOPPING CARRIER WITH PIVOTAL HANDLE SUPPORTING A REAR GATE
Lynn N. Davis, Emmett Township, Calhoun County, Mich., assignor to United Steel and Wire Company, Battle Creek, Mich., a corporation of Michigan
Filed Sept. 9, 1965, Ser. No. 486,000
7 Claims. (Cl. 280—33.99)

ABSTRACT OF THE DISCLOSURE

A shopping carrier construction of the nesting type including a basket having an opening in the rearward end thereof for receiving the forward end of a further carrier to be nested therewithin. The carrier includes a transversely spaced pair of substantially upright frame members located adjacent and on either side of the opening of the rear of the basket. A handle extends transversely between the upright members adjacent the upper ends thereof, the ends of the handle being pivotally supported on said upright members. A gate is rigidly affixed to the handle along one of its edges and extends generally downwardly to the bottom of the basket for closing the opened rear end therein. Alternatively, the gate may be pivoted forwardly and upwardly on the ends of the handle for opening the rearward end of the basket.

---

This invention relates to a shopping carrier construction and more specifically relates to a shopping carrier of the nesting type having an improved gate and handle construction.

The objects of this invention include:

(1) To provide a nesting type shopping carrier construction having an improved handle and gate construction.

(2) To provide a carrier, as aforesaid, which is quickly and easily manufacturable at low cost, which minimizes complex bending operations on the relatively large cross section rigid tubing used in the carrier frame, which is made of inexpensive and readily formed materials and which is easy to assemble.

(3) To provide a carrier, as aforesaid of the kind having a frame, an article carrying basket carried on the frame and a manually actuable handle located at the rear of the basket, in which the rearward wall of the basket comprises a gate pivotally supported adjacent the upper end thereof for swinging inwardly and upwardly into the basket in response to movement of the front end of the basket of another carrier forwardly thereagainst in which the handle is pivotally supported on the frame and in which the gate is rigidly affixed to and carried by the handle.

(4) To provide a carrier, as aforesaid, in which the gate is snugly pivoted without substantial play or clearance with respect to the carrier frame.

(5) To provide a carrier, as aforesaid, capable of withstanding hard usage for a relatively long service life without breaking down or requiring maintenance and which is readily repairable at low cost.

(6) To provide a carrier, as aforesaid, in which the handle is placed in relatively close proximity to the basket.

Other objects and purposes of this invention will be apparent to persons acquainted with apparatus of this general type upon reading the following specification and inspecting the accompanying drawings.

In the drawings:

FIGURE 2 is an enlarged, fragmentary and partially broken side elevational view of the carrier of FIGURE 1 taken from the leftward side thereof.

FIGURE 3 is a fragmentary sectional view substantially as taken on the line III—III of FIGURE 2.

FIGURE 4 is a fragmentary sectional view substantially as taken on the line IV—IV of FIGURE 3.

FIGURE 5 is a sectional view substantially as taken on the line V—V of FIGURE 3.

FIGURE 6 is a fragmentary, enlarged central cross-sectional view of the carrier of FIGURE 1 with the box 98 omitted.

Figure 1:
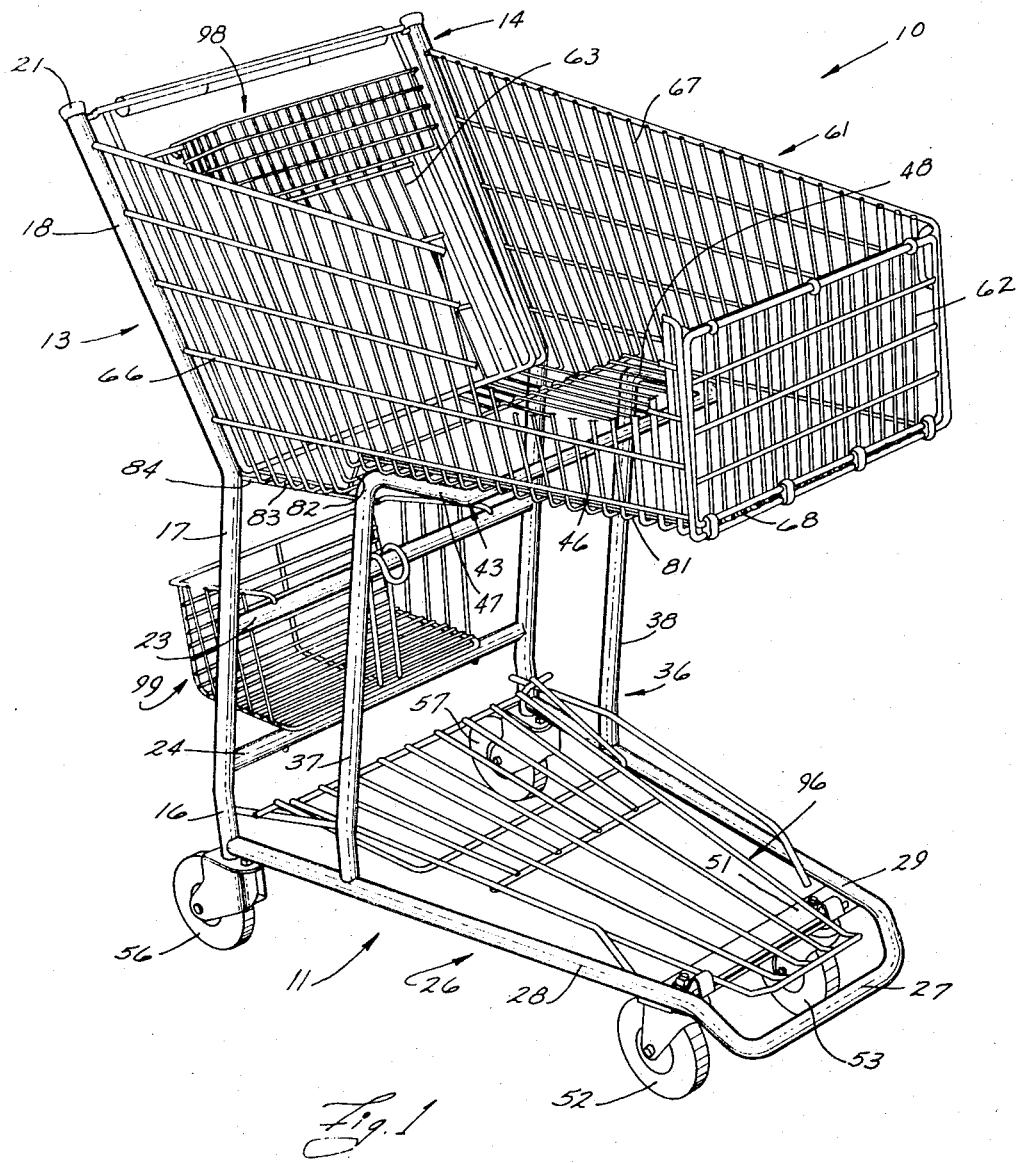
FIGURE 1 is a partially broken, oblique view of a carrier construction embodying the invention.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the direction of normal movement of the carrier and to the opposite direction, respectively, such directions being to the right and left as seen in FIGURES 1 and 2. The words "inwardly" and "outwardly" will refer to directions toward and away from, respectively, the geometric center of the device and designated parts thereof. Said terminology will include the words above mentioned, derivatives thereof and words of similar import.

General description

In general, the objects and purposes of this invention are met by providing a shopping carrier construction of the nesting type including a basket having an opening in the rearward end thereof for receiving the forward end of a further carrier to be nested therewithin. The carrier includes a transversely spaced pair of substantially upright frame members located adjacent and on either side of the opening in the rear of the basket. A handle extends transversely between the upright members adjacent the upper ends thereof, the ends of the handle being pivotally supported on said upright members. A gate is rigidly affixed to the handle along one of its edges and extends generally downwardly to the bottom of the basket for closing the open rear end of the basket. Alternatively, the gate may be pivoted forwardly and upwardly on the ends of the handle for opening the rearward end of the basket.

Detailed description

The carrier 10 (FIGURE 1) embodying the present invention includes a rigid frame 11. The frame 11 includes a transversely spaced pair of uprights 13 and 14, each comprising a short vertical lower segment 16, a slightly forwardly inclined intermediate segment 17 and a rearwardly angled upper segment 18. Caps 21 preferably of plastic or the like close the upper ends of the uprights 13 and 14 which, in the particular embodiment shown, are of metal tubing. Transverse cross braces 23 and 24 rigidly connect the intermediate segments 17 of the uprights 13 and 14. The frame 11 includes a base member 26 comprising a pair of side portions 28 and 29 which extend convergently forwardly from the lower segments 16 of the uprights 13 and 14 and terminate in a transverse forward portion 27.

The frame 11 further includes a basket support member 36 which is spaced forwardly from the uprights 13 and 14 and includes legs 37 and 38 upstanding from the side portions 28 and 29, respectively, and generally paralleling the lower portion 16 and intermediate portion 17 of said uprights. A rearwardly opening, U-shaped basket supporting portion 43 extends forwardly from and joins the upper ends of the legs 37 and 38 and has forwardly extending longitudinal portions 47 and 48 joined by a bight 46.

A transverse cross member 51 is rigidly secured to the base member 26 adjacent the forward end thereof. Swivel casters 52 and 53 are fixed beneath the ends of the cross member 51 and further casters 56 and 57 are fixed below the lower ends of the uprights 13 and 14 by any convenient means, not shown, for supporting the carrier 10 for movement.

The carrier 10 further includes an article carrying container 61 preferably constructed from metal rods welded together to form a mesh. The container or basket 61 has a forward wall 62, a rearward wall 63, side walls 66 and 67 and a bottom wall 68. In the preferred embodiment shown, the side walls are integral with the bottom wall, a number of rods in the bottom wall being continued in the side wall. The side walls 66 and 67 are preferably upstanding and converge towards the front ends thereof to allow nesting. The rearward ends of the side walls 66 and 67 are rigidly affixed to the forward faces of the upper segments 18 of the uprights 13 and 14 by any convenient means, not shown.

In the particular embodiment shown, the forward wall 62 is formed as a closure member operable to open or close the forward end of the basket 61. Further details of the forward wall 62 are disclosed in my application Ser. No. 486,161, filed Sept. 9, 1965, now Patent No. 3,297,108, issued Jan. 10 1967, and, as a result, further description thereof is not believed required here. Moreover, it will be noted that the present invention is not restricted to the particular openable front wall 62 hereinabove described, it being fully contemplated, for example, that a fixed forward wall may be employed.

The bottom wall 68 of the basket 61 has a forward portion 81 which is supported on the basket supporting portion 43 and affixed thereto by any convenient means, not shown. In the particular embodiment shown, the basket bottom 68 is stepped downwardly behind the basket support member 36 as indicated at 82 the rearward portion 83 thereof lying below the level of the forward portion 81. Brace rods 84 preferably extend beneath the rearward portion 83 of the basket bottom 68 and connect the uprights 13 and 14 with the legs 37 and 38, respectively.

The particular shopping carrier shown further includes a lower shelf 96 of any convenient construction normally disposed between the side portions 28 and 29 of the base member 26.

If desired, the carrier 10 may be provided with a box 98 of any convenient type supported on the inside of the rear wall 63 of the basket 61 for carrying small articles or the like. Further, the carrier 10 may, if desired, be furnished with a child seat 99 of any convenient type, here for example, removably affixed to the cross braces 23 and 24 by any convenient means and extending rearwardly therefrom. Alternatively, the box 98 and child seat 99 may be omitted and it is fully contemplated that, if desired, the rearward wall 53 of the basket 61 may be used to support a collapsible child seat of the type generally disclosed in U.S. Patent No. 2,911,227 assigned to the assignee of the present invention.

The carrier 10 as above described, has been disclosed as a preferred example of the type of shopping carrier into which the present invention may be incorporated. However, it will be understood that the present invention is not limited to the particular carrier 10 above described but may be used on a wide variety of different carriers. Further details of the carrier 10 above described are disclosed in my copending application Se. No. 486,164, filed Sept. 9, 1965, and Patent No. 3,297,108, issued Jan. 10, 1967.

The basic construction of the preferred embodiment of the carrier 10 as above described is, for purposes of illustration, substantially similar to the carriers of my copending application Ser. No. 486,164, filed Sept. 9, 1965, and Patent No. 3,297,108, issued Jan. 10, 1967.

Turning now more specifically to the construction 171 of the handle 76 and rearward wall 63 with which the present invention is particularly concerned, and to the connection thereof to the uprights 13 and 14, it will be noted that each of the uprights 13 and 14 are provided with an inwardly deformed or dimpled area 172 (FIGURE 3). The dimples 172 of the members 13 and 14 face each other and are coaxially aligned. The dimples 172 are located closely adjacent the upper ends of the uprights 13 and 14 and, more specifically, are disposed just beneath the caps 21. The dimples 172 form, inside the members 13 and 14, bearing areas 173 of circular configuration having a preferably flat central portion. Coaxial openings 174 extend through the inwardly facing walls of the uprights 13 and 14 concentrically of the bearing areas 173.

A handle 176 (FIGURES 3 and 5) includes a transversely extending, substantially rigid rod 175 which is preferably coaxially aligned with the openings 174 in the uprights 13 and 14, the ends of the rod 175 being spaced inwardly from said upright members 13 and 14. The handle 176 further includes a pivot rod 177 which has a central portion 178 which is parallel with and spaced from the rod 175. The central portion 178 is preferably slightly longer than the rod 175 but is still shorter than the distance between the uprights 13 and 14. With the gate in its closed position shown in FIGURES 1, 2 and 3, the central portion 178 is spaced forwardly from and somewhat above the rod 175. The pivot rod 177 has an integral step portion 179 at each end of the central portion 178 which extends radially toward the axis of the rod 175. The stepped portions 179 are disposed intermediate the uprights and the end of the rod 175. The pivot rod 177 has integral end portions 180 (FIGURES 2, 3 and 4) connected to and stepped from the central portion 178 by the step portions 179. The end portions 180 are preferably coaxially aligned with the rod 175 and extend transversely through the openings 174 and into the interior of the uprights 13 and 14 beyond the bearing surfaces 173.

The rod end portions 180 are held within the uprights 13 and 14 for pivotal movement with respect to the wall of the openings 174 by any convenient means. In the preferred embodiment shown, the end portions 180 are each provided with an opening 182 disposed closely adjacent the bearing surface 173. A suitable retainer, here a pin 183, is held, preferably by a press fit, within each of openings 182 and extends radially. Thus, removal of the end portion 180 from the opening 174 is prevented by interference between the bearing portion 173 and the pin 183.

The handle 76 further includes a pair of transversely elongated handle grips 186 and 187. The grips 186 and 187 are located above and below, respectively, the rods 175 and 177. Said grips are held tightly against such rods by any convenient means, here comprising rivets 188 spaced along the handle 176 and passing through centrally located openings 189 in the grips 186 and 187. In the particular embodiment shown, the grips 186 and 187 are provided with opposed relieved portions 191 which extend along the forward and rearward edge of such grips for snugly engaging and partially surrounding the rod 175 and the central portion 178 of the rod 177. The outer face 192 of the grips 186 and 187 is preferably smoothly curved and in the particular embodiment shown, the resulting handle 176 is substantially of circular cross section between the ends of the grips. The ends of the grips 186 and 187 preferably lie adjacent but somewhat inwardly spaced from the ends of the rod 175. If desired, the ends of such grips may be chamfered as indicated at 193 (FIGURES 3 and 4).

The end wall 63 includes at least a pair of upwardly extending side elements 196. The upper ends of the elements 196 are received between the central portion 178 and the rod 175 at locations between the steps 179 and the end of the grips 186 and 187. The upper ends of the side elements 196 are preferably tightly gripped by and welded to the rods 175 and 177. The end wall 63 thus comprises a generally planar gate which is pivotally hinged by means of the side elements 196 and handle 176 with respect to the upper ends of the uprights 13 and 14. The gate 63, in the particular embodiment shown, is comprised of a grid of spaced, substantially rigid rods 198 and 199 (FIGURES 1 and 6). The uppermost one of the transverse rods 198 is spaced below the handle 176 to form a hand opening 200. The side and bottom edges of the gate 63 are defined by the side elements 196 and an integral transverse extension 197 thereof, respectively, (FIGURE 1). Rearward movement of the bottom portion of the gate 63 is limited by interference thereof with the rod portion 201 at the rear of the rearward portion 83 of the bottom basket wall 68.

Operation

Although the operation of the combined handle-gate construction 171 has been indicated somewhat above, the same will briefly be summarized hereinbelow so that the invention will be more clearly understood.

With the gate 63 in its closed position shown in FIGURE 1, the lower end rod portion 201 thereof rests against the bottom wall 68 of the basket 61. In such condition, good may be loaded into the basket 61 and the carrier may be moved from place to place by a shopper manually engaging and pushing on the handle 176.

The pins 183 serve not only to prevent withdrawal of the ends of the pivot rod 177 from the openings in the uprights 13 and 14 but also prevent outward movement of the uprights 13 and 14 and, hence, movement of the rearward ends of the side walls of the basket away from each other despite overloading of the basket, rough handling or the like. Thus, the handle 176 tends to strengthen the upper ends of the frame 11 and basket 61. Moreover, the provision of stepped portions 179 closely adjacent the inner sides of the uprights 13 and 14 tends to limit inward movement of such uprights toward each other and, thereby further strengthens the carrier. The handle 176 is strengthened against bending upwardly or downwardly as seen in FIGURE 5 as might, for example, be caused by such inward movement of the uprights 13 and 14 and by the grips 186 and 187 and against bending forwardly and rearwardly by the spaced and rigidly connected configuration of the central portion 178 and rod 175.

When empty, the carrier 10 may receive a further carrier from the rearward end thereof into nesting engagement therewith. Nesting is accomplished by moving the forward end of a similar carrier forwardly toward the rearward end of the carrier 10, the foward basket end of the rearward carrier being urged into contact with the rearward face of the gate 63 and pushing the lower end thereof forwardly and upwardly so that the gate 63 pivots around the ends 180 of the pivot rod 177. The basket of the rearward carrier is thus received into the basket of the carrier 10 in nesting engagement therewith, the gate 63 lying atop the basket of the rearward cart.

It will be noted that the radial portion 179 in the pivot rod 177 places the pivot axis of the gate 63 and handle 176 close to the rearward surface of said gate and handle. As a result, the handle 176 lies for the most part above the pivot axis when the gate is open and, hence, cannot interfere with nesting of a further carrier basket within the basket 61. Moreover, the generally rearward placement of the pivot axis behind the center of the handle 176 and behind the upper end of the side elements 196 assures that such pivot axis will be well behind the center of gravity of the gate 53 when such as in its closed downwardly and forwardly inclined position of FIGURE 1. Any tendency of such gate to rattle or vibrate into and out of its closed position is thus lessened and the gate 63 tends to remain solidily in such closed position.

Although a particular preferred embodiment of the invention has been disclosed for purposes of illustration, it will be understood that variations or modifications thereof which lie within the scope of the appended claims are fully contemplated.

The embodiments of the invention in which an exclusive property or privilege is claimed as defined as follows:

1. In a gate construction for a nesting shopping carrier having a basket, the combination comprising:
   a transversely spaced pair of substantially upright tubular members;
   a gate member disposable between said upright members for closing a portion of the wall of the basket, said gate having a pair of substantially upwardly extending side elements;
   a tranverse, manually engageable handle fixed to the upper ends of said side elements and having ends extending therefrom;
   apertures in said upright tubular members adjacent the upper ends thereof for receiving said ends; and means on said ends located internally of said upright tubular members for preventing movement of said upright tubular members away from each other.

2. The device defined in claim 1 in which said handle comprises a spaced pair of rods disposed on opposite sides of said side elements, the ends of the rearward one of said rods being spaced from said upright members, the ends of the forward rod being stepped rearwardly outside said ends of said rearward rod and extending coaxially away therefrom through said apertures in said upright members.

3. The device defined in claim 2 including a pair of handle grips affixed on opposite sides of said forward and rearward rods for gripping same snugly therebetween, the ends of said handle grips being inwardly spaced from said stepped portions, said handle grips providing a manually engageable grip.

4. The device defined in claim 2 in which the central axes of said forward and rearward rods define a plane at right angles to the plane of said gate member.

5. The device defined in claim 2 in which said upright members are tubular, the ends of said handle are rods and said movement preventing means are pins extending through said ends adjacent the inner walls of said upright members and lying within said upright members, said inner upright member walls being dimpled at said apertures to provide a continuous bearing area for said pins.

6. The device defined in claim 2 in which said gate member is comprised of a plurality of rods welded to form a grid.

7. The device defined in claim 2 in which the bottom of the gate rests against means on the basket bottom to limit rearward movement of said gate member with respect to the carrier.

References Cited
UNITED STATES PATENTS

| | | | |
|---|---|---|---|
| 2,583,513 | 1/1952 | Maslow | 280—33.99 |
| 2,813,725 | 11/1957 | Hoedinghaus et al. | 280—33.99 |
| 2,890,059 | 6/1959 | Brooks et al. | 280—33.99 |
| 2,911,227 | 11/1959 | Davis | 280—33.99 |
| 2,918,741 | 12/1959 | Welter et al. | |
| 3,023,018 | 2/1962 | Welter | 280—33.99 |

BENJAMIN HERSH, *Primary Examiner.*

MILTON L. SMITH, *Examiner.*